(12) United States Patent
Zhao et al.

(10) Patent No.: US 12,021,566 B2
(45) Date of Patent: Jun. 25, 2024

(54) PHOTONICS-AIDED VECTOR TERAHERTZ SIGNAL COMMUNICATION SYSTEM

(71) Applicant: XI'AN UNIVERSITY OF POSTS & TELECOMMUNICATIONS, Shaanxi (CN)

(72) Inventors: Feng Zhao, Shaanxi (CN); Jianjun Yu, Shaanxi (CN); Jingling Li, Shaanxi (CN); Jiamin Gong, Shaanxi (CN)

(73) Assignee: XI'AN UNIVERSITY OF POSTS & TELECOMMUNICATIONS, Shaanxi (CN)

( * ) Notice: Subject to any disclaimer, the term of this patent is extended or adjusted under 35 U.S.C. 154(b) by 0 days.

(21) Appl. No.: 17/613,721

(22) PCT Filed: Apr. 20, 2021

(86) PCT No.: PCT/CN2021/088307
§ 371 (c)(1),
(2) Date: Nov. 23, 2021

(87) PCT Pub. No.: WO2022/174512
PCT Pub. Date: Aug. 25, 2022

(65) Prior Publication Data
US 2024/0022333 A1 Jan. 18, 2024

(30) Foreign Application Priority Data
Feb. 19, 2021 (CN) .......................... 202110188426.4

(51) Int. Cl.
*H04B 10/50* (2013.01)
*H04B 10/532* (2013.01)
(Continued)

(52) U.S. Cl.
CPC ........... *H04B 10/54* (2013.01); *H04B 10/532* (2013.01); *H04B 10/90* (2013.01); *H04B 10/50* (2013.01);
(Continued)

(58) Field of Classification Search
CPC ...... H04B 10/54; H04B 10/532; H04B 10/90; H04B 10/50; H04B 10/505; H04B 10/5051; H04B 10/5053; H04J 14/00; H04J 14/06
(Continued)

(56) References Cited

U.S. PATENT DOCUMENTS

| 4,551,689 A | * | 11/1985 | Scala | H03L 7/23 |
| | | | | 331/25 |
| 9,906,305 B2 | * | 2/2018 | Yu | H04B 10/90 |
| 10,044,444 B2 | * | 8/2018 | Yu | H04B 10/541 |
| 2009/0067843 A1 | * | 3/2009 | Way | H04J 14/0246 |
| | | | | 398/43 |

(Continued)

OTHER PUBLICATIONS

Li et al, 16-QAM Vector Terahertz-wave Signal Generation by Simple MZM-Based Optical Frequency Comb, Dec. 2020, IEEE, All Document. (Year: 2020).*

(Continued)

*Primary Examiner* — Dibson J Sanchez
(74) *Attorney, Agent, or Firm* — Brannon Sowers & Cracraft PC; Kevin R. Erdman

(57) ABSTRACT

The present disclosure provides a photonics-aided vector terahertz signal communication system. The system includes an optical frequency comb generation module, a vector terahertz signal generation module, an optical fiber transmission module, a vector terahertz signal detection module, and a vector terahertz signal emission module that are sequentially connected, where the vector terahertz signal generation module includes a first binary sequence genera- (Continued)

tor, a first electronic amplifier, and a first intensity modulator that are sequentially connected, the first binary sequence generator generates binary data representing to-be-transmitted data, the first intensity modulator performs, based on the binary data, amplitude modulation on an optical frequency comb entering the first intensity modulator, and an optical signal obtained after the modulation of the first intensity modulator is a vector terahertz signal carrying the to-be-transmitted data. In the present disclosure, a vector terahertz signal can be generated by using an intensity modulator.

16 Claims, 2 Drawing Sheets

(51) Int. Cl.
　　H04B 10/54　　(2013.01)
　　H04B 10/90　　(2013.01)
　　H04J 14/00　　(2006.01)
　　H04J 14/06　　(2006.01)
(52) U.S. Cl.
　　CPC ........ H04B 10/505 (2013.01); H04B 10/5051 (2013.01); H04B 10/5053 (2013.01); H04J 14/00 (2013.01); H04J 14/06 (2013.01)
(58) Field of Classification Search
　　USPC .................................... 398/43–103, 182–201
　　See application file for complete search history.

(56) References Cited

U.S. PATENT DOCUMENTS

| | | | |
|---|---|---|---|
| 2012/0207475 A1* | 8/2012 | Tian ..................... | H04B 10/671 398/65 |
| 2013/0195455 A1* | 8/2013 | Jansen ................. | H04B 10/548 398/65 |
| 2015/0117869 A1* | 4/2015 | Wakayama ........ | H04B 10/5053 398/185 |
| 2016/0248515 A1* | 8/2016 | Zheng .................... | H04J 14/02 |
| 2017/0126324 A1* | 5/2017 | Yu .......................... | H04B 10/70 |
| 2018/0019818 A1* | 1/2018 | Yu ....................... | H04B 10/5165 |
| 2019/0157757 A1* | 5/2019 | Murakowski ........ | H04B 10/548 |
| 2020/0112384 A1* | 4/2020 | Yu ........................ | H04B 7/0413 |
| 2021/0234616 A1* | 7/2021 | Morsy-Osman ....... | H04B 10/67 |
| 2022/0231764 A1* | 7/2022 | Ghannouchi .... | H04B 10/25759 |

OTHER PUBLICATIONS

Nagatsuma et al, Photonic Generation of Millimeter and Terahertz Waves and Its Applications, Jun. 2008, ICECOM, All Document. (Year: 2008).*

Nagatsuma et al, Millimeter-Wave and Terahertz-Wave Applications Enabled by Photonics, Jan. 2016, IEEE, All Document. (Year: 2016).*

Yu et al, Terahertz-Wave Generation Based on Optical Frequency Comb and Single Mach-Zehnder Modulator, Feb. 2020, IEEE, All Document. (Year: 2020).*

* cited by examiner

PHOTONICS-AIDED VECTOR TERAHERTZ SIGNAL COMMUNICATION SYSTEM

CROSS-REFERENCE TO RELATED APPLICATIONS

The present application is a National Stage of PCT International Application Serial Number PCT/CN2021/088307, filed Apr. 20, 2021, which claims priority under 35 U.S.C. § 119 to Chinese Patent Application Serial Number 202110188426.4, filed Feb. 19, 2021, the disclosures of which are incorporated by reference herein.

BACKGROUND OF THE INVENTION

The present disclosure relates to the field of communications, and in particular, to a photonics-aided vector terahertz signal communication system.

While access to 5G reaches a peak rate of 1 Gbit/s to 20 Gbit/s, it still cannot satisfy increasing requirements on data traffic in future broadband communications. In the soon future, a data transmission rate can reach 400 Gbit/s or even 1 Tbit/s, and therefore, it is necessary to explore new frequency bands for transmission. The photonics-aided millimeter wave and terahertz broadband communication technology can implement a perfect combination of fiber communication and wireless communication, and has both advantages of fiber communication with a high capacity and wireless communication with good mobility. It can overcome a bandwidth bottleneck of an electronic device, and can also resolve a problem in voluminous mobile data access and high-speed wireless transmission between intelligent devices. In addition, the communication technology can also be applied to deep space communication and emergency communication, among others. Therefore, the photonics-aided millimeter wave and terahertz communication is highly advantageous technical means for post-5G and future 6G development and high-speed transmission of spatial information networks.

At present, there are three methods for generating terahertz (THz): (1) An electronic device-based THz generator, which includes a radio frequency source, a frequency multiplier, an electrical signal mixer, and an electrical signal amplifier. The radio frequency signal source generates a radio frequency signal with a frequency of about tens of GHz. After frequency conversion is performed on the radio frequency signal by using the frequency multiplier, a modulated signal is generated by using the electrical signal mixer, and is sent through an antenna after being amplified. This process has a relatively high requirement on a bandwidth and gain of an electronic device; modulation and demodulation processes can cause a relatively great loss in the conversion; and the device is usually highly expensive. (2) A semiconductor laser-based THz generator. For example, a quantum cascade laser is adopted, which can generate a THz signal with a frequency above 1 THz. The terahertz quantum cascade laser has a small size, a compact structure, and short-lived charge carriers, and can be used for high-speed modulation. However, it imposes stringent performance requirements on THz emitters, and requires the emitters to work at ultra-low temperatures. Therefore, this solution is not highly applicable. (3) A photonics-aided-based THz generator. To be specific, an optical heterodyne method is used. Two or more beams of optical signals are generated by a laser, the signals are modulated onto optical carriers, and then through a photoelectric detector, a THz signal with a frequency that is an optical frequency difference between the two beams of light is generated. If optical signals at specific frequency intervals (an optical frequency comb) can be generated, a frequency difference between any two beams of light can be selected as the frequency of the THz signal. Advantages of the method are that adjusting a frequency is relatively easier, THz signals with different frequencies can be conveniently obtained, and the method can be applied to a multi-carrier system.

Because a conventional photoelectric detector adopts square law detection of beat frequencies, in a solution in which an external modulator is used for vector signal generation, amplitude information and phase information of a transmitted multi-order quadrature amplitude modulation signal have to be precoded, which greatly increases complexity of a system. In addition, in a conventional solution of generating a photonics-aided vector terahertz signal, it usually needs a high-performance Arbitrary Waveform Generator (AWG) or Digital Analog Converter (DAC) to implement conversion from a digital signal to an analog signal. Most of these devices are expensive and have a relatively large power consumption, which greatly increases system transmission costs. Further, all existing digital analog converters are bottlenecked electronically due to a limited electronic bandwidth of 3 dB, and consequently, at present, a high-order drive signal or high-speed drive signal cannot be generated. The foregoing factors all limit the development of future high-speed 5G, ultra 5G, and even 6G mobile communication.

SUMMARY

The present disclosure aims to provide a photonics-aided vector terahertz signal communication system.

To implement the foregoing objective, the present disclosure provides following solutions:

A photonics-aided vector terahertz signal communication system is provided. The system includes an optical frequency comb generation module, a vector terahertz signal generation module, an optical fiber transmission module, a vector terahertz signal detection module, and a vector terahertz signal emission module that are sequentially connected, where the vector terahertz signal generation module includes a first binary sequence generator, a first electronic amplifier, and a first intensity modulator that are sequentially connected, the first binary sequence generator generates binary data representing to-be-transmitted data, the first intensity modulator performs, based on the binary data, amplitude modulation on an optical frequency comb entering the first intensity modulator, and an optical signal obtained after the modulation of the first intensity modulator is a vector terahertz signal carrying the to-be-transmitted data.

In an embodiment, the vector terahertz signal generation module further includes a polarization maintaining coupler, an optical attenuator, a 90° optical phase shifter, a polarization beam combiner, and a second binary sequence generator, a second electronic amplifier, and a second intensity modulator that are sequentially connected.

The polarization maintaining coupler separates an optical frequency comb generated by the optical frequency comb generation module into two optical frequency combs, one comb enters the first intensity modulator, and the other comb enters the second intensity modulator.

The second intensity modulator performs, based on the binary data that represents to-be-transmitted data and that is generated by the second binary sequence generator, amplitude modulation on an optical frequency comb entering the second intensity modulator, and an optical signal obtained after the modulation of the second intensity modulator is a vector terahertz signal carrying the to-be-transmitted data.

The optical attenuator adjusts an intensity of the optical signal output by the first intensity modulator or the second intensity modulator, such that the intensity of the optical signal output by the first intensity modulator is the same as the intensity of the optical signal output by the second intensity modulator.

The 90° optical phase shifter performs phase shift on the optical signal output by the first intensity modulator or the second intensity modulator, such that a difference between phases of the optical signal output by the first intensity modulator and the optical signal output by the second intensity modulator is 90°.

The polarization beam combiner combines the two optical signals that are obtained after intensity attenuation and phase shift into one signal.

In an embodiment, the vector terahertz signal detection module includes a signal separation unit used to separate an optical signal transmitted by the optical fiber transmission module, and includes a first optical interleaver, an optical notch filter, and a second optical interleaver that are sequentially connected.

In an embodiment, the vector terahertz signal detection module includes a photoelectric detector, and an output end of the photoelectric detector is connected to the vector terahertz signal emission module.

In an embodiment, the optical frequency comb generation module includes an external cavity laser, a third intensity modulator, a phase modulator, an intensity modulator drive module, and a phase modulator drive module. The external cavity laser, the third intensity modulator, and the phase modulator are sequentially connected.

In an embodiment, the intensity modulator drive module includes a first signal radio frequency source, a first frequency multiplier, and a third electronic amplifier that are sequentially connected, where an output end of the third electronic amplifier is connected to a drive end of the third intensity modulator.

In an embodiment, the phase modulator drive module includes a second signal radio frequency source, a second frequency multiplier, and a fourth electronic amplifier that are sequentially connected, where an output end of the fourth electronic amplifier is connected to a drive end of the phase modulator.

In an embodiment, the optical frequency comb generation module further includes a polarization maintaining fiber amplifier, where an input end of the polarization maintaining fiber amplifier is connected to an output end of the phase modulator, and an output end of the polarization maintaining fiber amplifier is connected to an input end of the vector terahertz signal generation module.

In an embodiment, the optical fiber transmission module includes an optical fiber and an optical fiber amplifier, where one end of the optical fiber is connected to an output end of the vector terahertz signal generation module, the other end of the optical fiber is connected to one end of the optical fiber amplifier, and the other end of the optical fiber amplifier is connected to the vector terahertz signal detection module.

In an embodiment, the vector terahertz signal emission module includes an antenna.

According to specific embodiments provided in the present disclosure, the present disclosure offers the following technical effects. The photonics-aided vector terahertz signal communication system provided in the present disclosure is operable without a digital analog converter. An intensity modulator is used to implement generation of a vector terahertz signal, and extra digital signal processing is not required for precoding. The generated terahertz (THz) signal has a stable frequency and the frequency can be conveniently adjusted. The system is of critical significance of application in development of future high-speed and high-capacity ultra-5G and even 6G mobile communication networks.

BRIEF DESCRIPTION OF THE DRAWINGS

To describe the technical solutions in embodiments of the present disclosure or in the conventional technology more clearly, the accompanying drawings for the embodiments are briefly described below. Clearly, the accompanying drawings in the following descriptions show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions of embodiments of the present disclosure are clearly and completely described below with reference to the accompanying drawings. Clearly, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To make the foregoing objectives, features, and advantages of the present disclosure clearer and more comprehensible, the present disclosure is further described in detail below with reference to the accompanying drawings and a specific embodiment.

Embodiment 1

Figure 1:
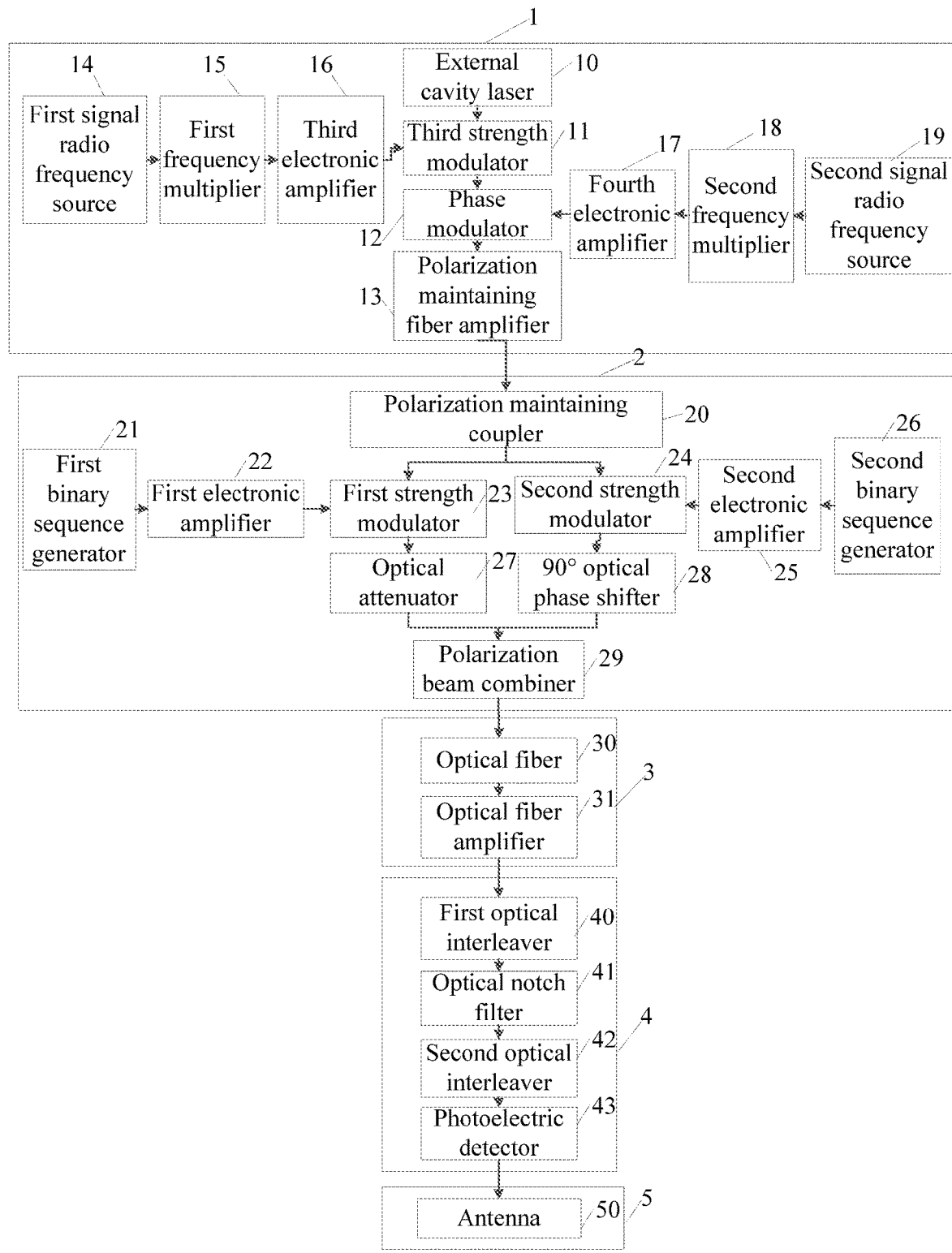
FIG. 1 is a schematic structural diagram of a photonics-aided vector terahertz signal communication system according to embodiment 1 of the present disclosure.

Refer to FIG. 1, this embodiment provides a photonics-aided vector terahertz signal communication system, and the system includes an optical frequency comb generation module 1, a vector terahertz signal generation module 2, an optical fiber transmission module 3, a vector terahertz signal detection module 4, and a vector terahertz signal emission module 5 that are sequentially connected.

The vector terahertz signal generation module 2 includes a polarization maintaining coupler 20, and a first binary sequence generator 21, a first electronic amplifier 22, and a first intensity modulator 23 that are sequentially connected; and an optical attenuator 27, a 90° optical phase shifter 28, a polarization beam combiner 29, and a second binary sequence generator 26, a second electronic amplifier 25, and a second intensity modulator 24 that are sequentially connected. The polarization maintaining coupler 20 separates an optical frequency comb generated by the optical frequency comb generation module 1 into two optical frequency combs, one comb enters the first intensity modulator 23, and the other comb enters the second intensity modulator 24.

The first binary sequence generator 21 generates binary data representing to-be-transmitted data, the first intensity modulator 23 performs, based on the binary data, amplitude modulation on the optical frequency comb entering the first intensity modulator 23, and an optical signal obtained after the modulation of the first intensity modulator 23 is a vector terahertz signal carrying the to-be-transmitted data. The second intensity modulator 24 performs, based on the binary data that represents to-be-transmitted data and that is generated by the second binary sequence generator 26, amplitude modulation on the optical frequency comb entering the second intensity modulator 24, and an optical signal obtained after the modulation of the second intensity modulator 24 is a vector terahertz signal carrying the to-be-transmitted data. The optical attenuator 27 adjusts an intensity of the optical signal output by the first intensity modulator 23 or the second intensity modulator 24, such that the intensity of the optical signal output by the first intensity modulator 23 is the same as the intensity of the optical signal output by the second intensity modulator 24. The 90° optical phase shifter 28 performs phase shift on the optical signal output by the first intensity modulator 23 or the second intensity modulator 24, such that a difference between phases of the optical signal output by the first intensity modulator 23 and the optical signal output by the second intensity modulator 24 is 90°. The polarization beam combiner 29 combines the two optical signals that are obtained after intensity attenuation and phase shift into one signal.

In an implementation of this embodiment, the optical frequency comb generation module 1 includes an external cavity laser 10, a third intensity modulator 11, a phase modulator 12, an intensity modulator drive module, and a phase modulator drive module. The external cavity laser 10, the third intensity modulator 11, and the phase modulator 12 are sequentially connected. The intensity modulator drive module includes a first signal radio frequency source 14, a first frequency multiplier 15, and a third electronic amplifier 16 that are sequentially connected, where an output end of the third electronic amplifier 16 is connected to a drive end of the third intensity modulator 11. The phase modulator drive module includes a second signal radio frequency source 19, a second frequency multiplier 18, and a fourth electronic amplifier 17 that are sequentially connected, where an output end of the fourth electronic amplifier 17 is connected to a drive end of the phase modulator 12.

In an implementation of this embodiment, the optical frequency comb generation module 1 further includes a polarization maintaining fiber amplifier 13, where an input end of the polarization maintaining fiber amplifier 13 is connected to an output end of the phase modulator 12, and an output end of the polarization maintaining fiber amplifier 13 is connected to an input end of the vector terahertz signal generation module 2.

In an implementation of this embodiment, the optical fiber transmission module 3 includes an optical fiber 30 and an optical fiber amplifier 31 where one end of the optical fiber 30 is connected to an output end of the vector terahertz signal generation module 2, the other end of the optical fiber 30 is connected to one end of the optical fiber amplifier 31, and the other end of the optical fiber amplifier 31 is connected to the vector terahertz signal detection module 4.

In this embodiment, the vector terahertz signal detection module 4 includes a signal separation unit and a photoelectric detector 43, where the signal separation unit is used to separate an optical signal transmitted by the optical fiber transmission module 3, that is, to split the two beams integrated by the polarization beam combiner 29. The signal separation unit includes a first optical interleaver 40, an optical notch filter 41, and a second optical interleaver 42 that are sequentially connected. An input end of the photoelectric detector 43 is connected to an output end of the signal separation unit, and an output end of the photoelectric detector 43 is connected to the vector terahertz signal emission module 5.

In an implementation of this embodiment, the vector terahertz signal emission module 5 includes an antenna 50.

In this embodiment, the external cavity laser 10 generates a continuous coherent light with a center frequency of fc, and sends the continuous coherent light to the third intensity modulator 11. A radio frequency signal source with a frequency of 14.02 GHz emitted by the first signal radio frequency source 14 is sextupled in the frequency by the first frequency multiplier 15 and amplified by the third electronic amplifier 16, to drive the third intensity modulator 11. The third intensity modulator 11 operates in a double-sideband modulation mode, and the third intensity modulator 11 outputs a spectrum at frequencies of fc, fc+14.02×6, and fc−14.02×6, and sends the output frequencies to the phase modulator 12. A radio frequency signal source with a frequency of 9.8 GHz emitted by the second signal radio frequency source 19 is quadrupled in the frequency by the second frequency multiplier 18 and amplified by the fourth electronic amplifier 17, to drive the phase modulator 12 to control a drive signal amplitude and make the phase modulator 12 output only three orders of spectral components, and the output is sent to the polarization maintaining coupler 20 after an operation of the polarization maintaining fiber amplifier 13. After an operation of the polarization maintaining coupler 20, two polarized lights transmitted up and down are obtained, where an upper polarized light is sent to the first intensity modulator 23, a binary signal data1 that represents to-be-transmitted data and that is generated by the first binary sequence generator 21 is amplified by the first electronic amplifier 22, to drive the first intensity modulator 23, and an output signal of the first intensity modulator 23 is sent to the optical attenuator 27; a binary signal data2 that represents to-be-transmitted data and that is generated by the second binary sequence generator 26 is amplified by the second electronic amplifier 25, to drive the second intensity modulator 24, a lower polarized light is sent to the second intensity modulator 24, and an output of the second intensity modulator 24 is sent to the 90° optical phase shifter 28; and the optical attenuator 27 is adjusted to make powers of two output lights equal to each other, and the 90° optical phase shifter 28 makes a phase difference between the two up-and-down lights equal to 90°. The two up-and-down polarized lights are combined into one signal by the polarization beam combiner 29, and the light is sent to the first optical interleaver 40 of 50/200 GHz after an operation of the optical fiber amplifier 31. An output of the first optical interleaver 40 is sent to the optical notch filter 41 to filter a center carrier, and an output of the optical notch filter 41 is sent to the second optical interleaver 42 of 50/100 GHz, and output spectral components are fc−84.12−3×39.2 and fc+84.12+3×39.2, where a spectral interval between the spectral components is 403.44 GHz. The output of the second optical interleaver 42 is operated by the photoelectric detector 43, to generate a vector quadrature phase shift keying (QPSK) signal with a frequency of 403.44 GHz, and the output may be indicated by using $I_{out}$, $I_{out} \propto data2^2(t)\cos[j2\pi(2f_{RF1}+6f_{RF2})t]-data1^2(t)\sin[j2\pi(2f_{RF1}+6f_{RF2})t]$, where $f_{RF1}$ is 84.12 GHz, $f_{RF2}$ is 39.2 GHz, and $2f_{RF1}+6f_{RF2}$ is 403.44 GHz. The output of the photoelectric detector 43 is transmitted into a free space through the antenna 50, to implement wireless transmission of a terahertz vector signal.

The photonics-aided vector terahertz signal communication system provided in this embodiment has the following advantages:

(1) A terahertz signal of 400 GHz is generated optically, and the generated terahertz signal has a small phase noise and a stable frequency; and a frequency of the generated terahertz (THz) signal can be conveniently adjusted. Compared with common heterodyne with a plurality of light sources for generating a THz signal, in this embodiment, two spectra on which frequency beating is performed are generated from a same light source, so that a THz signal generated after frequency beating has a small phase noise and a stable frequency. By cascading an intensity modulator and a phase modulator and through design of system parameters, a spectral distribution of an optical frequency comb is constructed, any interval can be selected to be a spectral component of a THz waveband, and a signal in the THz waveband is generated after photoelectric detection. A frequency of a THz signal generated by using this method can be adjusted, and the method can be applied to a multi-carrier system. Different signals are loaded for spectral components of different orders, so that multi-carrier transmission can be implemented, thereby improving a system transmission capacity.

(2) A vector QPSK signal is generated by using an intensity modulator, and a costly arbitrary waveform generator (AWG) and digital analog converter (DAC) are not needed. A binary signal that represents to-be transmitted data and that is generated by a binary sequence generator can be directly used to drive a modulator after being amplified by an electronic amplifier. One beam of light is split into two after an operation of a polarization maintaining coupler. Then, two beams of light are loaded by the intensity modulator by using data1 and data2, and a 90° optical phase shifter makes a phase difference of the two beams of light equal to 90°. A polarization beam combiner combines the two beams of light at an X polarization direction and a Y polarization direction into one. After electric detection, vector modulation can be implemented, in which generation of a vector signal does not require precoding.

Embodiment 2

Figure 2:
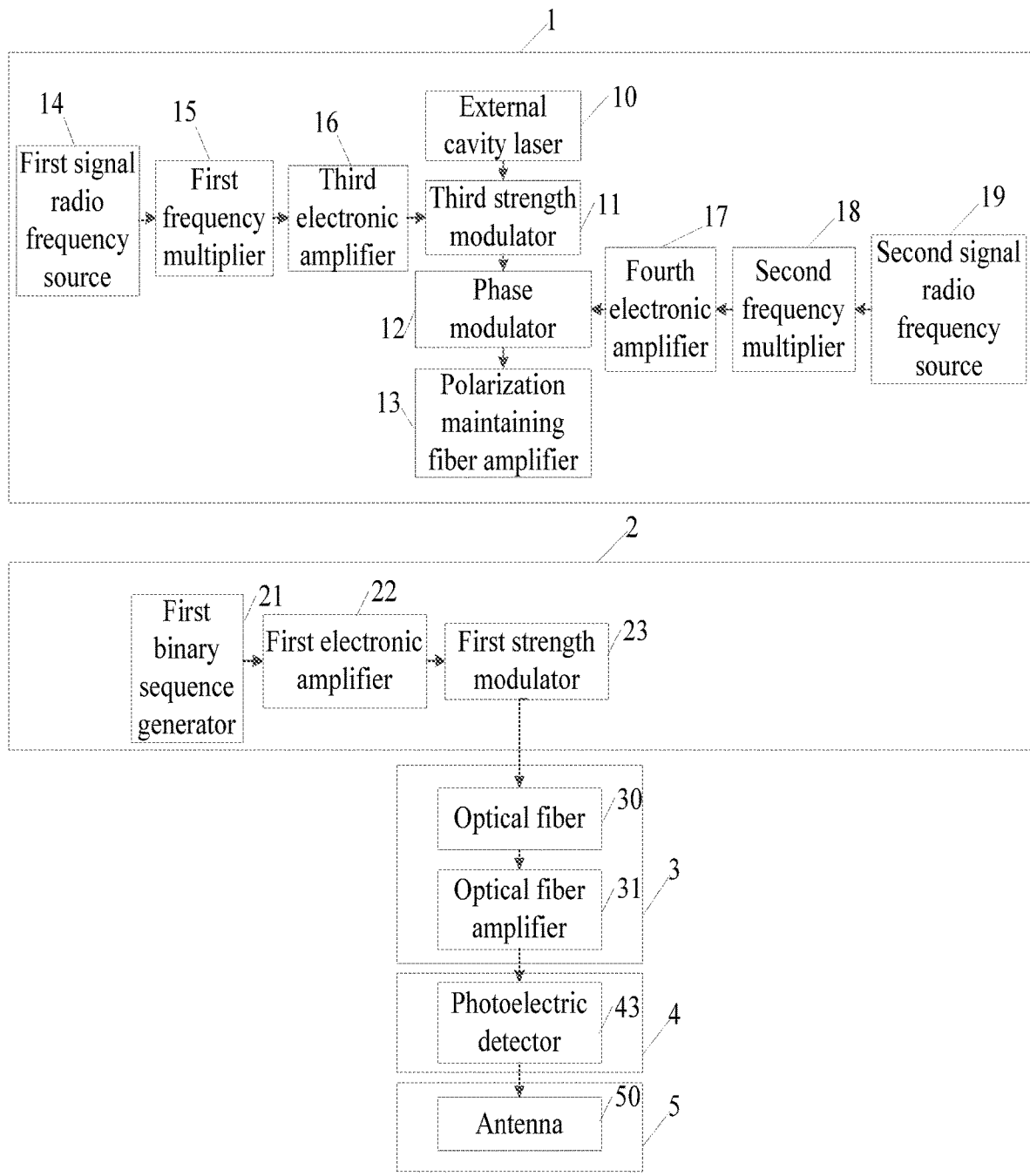
FIG. 2 is a schematic structural diagram of a photonics-aided vector terahertz signal communication system according to embodiment 2 of the present disclosure.

Refer to FIG. 2, this embodiment provides a photonics-aided vector terahertz signal communication system. The system includes an optical frequency comb generation module 1, a vector terahertz signal generation module 2, an optical fiber transmission module 3, a vector terahertz signal detection module 4, and a vector terahertz signal emission module 5 that are sequentially connected, where the vector terahertz signal generation module 2 includes a first binary sequence generator 21, a first electronic amplifier 22, and a first intensity modulator 23 that are sequentially connected. The first binary sequence generator 21 generates binary data representing to-be-transmitted data, the first intensity modulator 23 performs, based on the binary data, amplitude modulation on an optical frequency comb entering the first intensity modulator 23, and an optical signal obtained after the modulation of the first intensity modulator 23 is a vector terahertz signal carrying the to-be-transmitted data.

In an implementation of this embodiment, the optical frequency comb generation module 1 includes an external cavity laser 10, a third intensity modulator 11, a phase modulator 12, an intensity modulator drive module, and a phase modulator drive module. The external cavity laser 10, the third intensity modulator 11, and the phase modulator 12 are sequentially connected. The intensity modulator drive module includes a first signal radio frequency source 14, a first frequency multiplier 15, and a third electronic amplifier 16 that are sequentially connected, where an output end of the third electronic amplifier 16 is connected to a drive end of the third intensity modulator 11. The phase modulator drive module includes a second signal radio frequency source 19, a second frequency multiplier 18, and a fourth electronic amplifier 17 that are sequentially connected, where an output end of the fourth electronic amplifier 17 is connected to a drive end of the phase modulator 12.

In an implementation of this embodiment, the optical frequency comb generation module 1 further includes a polarization maintaining fiber amplifier 13, where an input end of the polarization maintaining fiber amplifier 13 is connected to an output end of the phase modulator 12, and an output end of the polarization maintaining fiber amplifier 13 is connected to an input end of the vector terahertz signal generation module 2.

In an implementation of this embodiment, the optical fiber transmission module 3 includes an optical fiber 30 and an optical fiber amplifier 31, where one end of the optical fiber 30 is connected to an output end of the vector terahertz signal generation module 2, the other end of the optical fiber 30 is connected to one end of the optical fiber amplifier 31, and the other end of the optical fiber amplifier 31 is connected to the vector terahertz signal detection module 4.

In an implementation of this embodiment, the vector terahertz signal detection module 4 includes a photoelectric detector 43, and an output end of the photoelectric detector 43 is connected to the vector terahertz signal emission module 5.

In an implementation of this embodiment, the vector terahertz signal emission module 5 includes an antenna 50.

In this embodiment, by cascading an intensity modulator and a phase modulator and through design of system parameters, a spectral distribution of an optical frequency comb is constructed, arbitrary interval can be selected to be a spectral component of a THz waveband, and a signal in the THz waveband is generated after photoelectric detection. A frequency of a THz signal generated by using this method can be adjusted. A vector QPSK signal is generated by using an intensity modulator, and a costly arbitrary waveform generator (AWG) and digital analog converter (DAC) are not needed. A binary signal that represents to-be transmitted data and that is generated by a binary sequence generator can be directly used to drive a modulator after being amplified by an electronic amplifier.

Each embodiment of the present specification is described in a progressive manner, each embodiment focuses on the difference from other embodiments, and the same and similar parts between the embodiments may refer to each other.

In this specification, several examples are used for illustration of the principles and implementations of the present disclosure. The descriptions in the foregoing embodiments are used to help illustrate the method of the present disclosure and the core principles thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A photonics-aided vector terahertz signal communication system, comprising an optical frequency comb generation module, a vector terahertz signal generation module, an optical fiber transmission module, a vector terahertz signal detection module, and a vector terahertz signal emission module that are sequentially connected, wherein the vector terahertz signal generation module comprises a first binary sequence generator, a first electronic amplifier, and a first intensity modulator that are sequentially connected, the first binary sequence generator generates binary data representing to-be-transmitted data, the first intensity modulator performs, based on the binary data, amplitude modulation on an optical frequency comb entering the first intensity modulator, and an optical signal obtained after the modulation of the first intensity modulator is a vector terahertz signal carrying the to-be-transmitted data;

wherein the vector terahertz signal generation module further comprises a polarization maintaining coupler, an optical attenuator, a 90° optical phase shifter, a polarization beam combiner, and a second binary sequence generator, a second electronic amplifier, and a second intensity modulator that are sequentially connected, wherein the polarization maintaining coupler separates an optical frequency comb generated by the optical frequency comb generation module into two optical frequency combs, one comb entering the first intensity modulator, and the other comb entering the second intensity modulator;

the second intensity modulator performs, based on the binary data that represents to-be-transmitted data and that is generated by the second binary sequence generator, amplitude modulation on the optical frequency comb entering the second intensity modulator, and an optical signal obtained after the modulation of the second intensity modulator is a vector terahertz signal carrying the to-be-transmitted data;

the optical attenuator adjusts an intensity of the optical signal output by the first intensity modulator or the second intensity modulator, such that the intensity of the optical signal output by the first intensity modulator is the same as the intensity of the optical signal output by the second intensity modulator;

the 90° optical phase shifter performs phase shift on the optical signal output by the first intensity modulator or the second intensity modulator, such that a difference between phases of the optical signal output by the first intensity modulator and the optical signal output by the second intensity modulator is 90°; and the polarization beam combiner combines the two optical signals that are obtained after intensity attenuation and phase shift into one signal.

2. The photonics-aided vector terahertz signal communication system according to claim 1, wherein the vector terahertz signal detection module comprises a signal separation unit used to separate an optical signal transmitted by the optical fiber transmission module, and comprises a first optical interleaver, an optical notch filter, and a second optical interleaver that are sequentially connected.

3. The photonics-aided vector terahertz signal communication system according to claim 1, wherein the vector terahertz signal detection module comprises a photoelectric detector, and an output end of the photoelectric detector is connected to the vector terahertz signal emission module.

4. The photonics-aided vector terahertz signal communication system according to claim 1, wherein the optical frequency comb generation module comprises an external cavity laser, a third intensity modulator, a phase modulator, an intensity modulator drive module, and a phase modulator drive module, wherein the external cavity laser, the third intensity modulator, and the phase modulator are sequentially connected.

5. The photonics-aided vector terahertz signal communication system according to claim 4, wherein the intensity modulator drive module comprises a first signal radio frequency source, a first frequency multiplier, and a third electronic amplifier that are sequentially connected, wherein an output end of the third electronic amplifier is connected to a drive end of the third intensity modulator.

6. The photonics-aided vector terahertz signal communication system according to claim 4, wherein the phase modulator drive module comprises a second signal radio frequency source, a second frequency multiplier, and a fourth electronic amplifier that are sequentially connected, wherein an output end of the fourth electronic amplifier is connected to a drive end of the phase modulator.

7. The photonics-aided vector terahertz signal communication system according to claim 4, wherein the optical frequency comb generation module further comprises a polarization maintaining fiber amplifier, wherein an input end of the polarization maintaining fiber amplifier is connected to an output end of the phase modulator, and an output end of the polarization maintaining fiber amplifier is connected to an input end of the vector terahertz signal generation module.

8. The photonics-aided vector terahertz signal communication system according to claim 1, wherein the vector terahertz signal detection module comprises a photoelectric detector, and an output end of the photoelectric detector is connected to the vector terahertz signal emission module.

9. The photonics-aided vector terahertz signal communication system according to claim 1, wherein the optical frequency comb generation module comprises an external cavity laser, a third intensity modulator, a phase modulator, an intensity modulator drive module, and a phase modulator drive module, wherein the external cavity laser, the third intensity modulator, and the phase modulator are sequentially connected.

10. The photonics-aided vector terahertz signal communication system according to claim 9, wherein the intensity modulator drive module comprises a first signal radio frequency source, a first frequency multiplier, and a third electronic amplifier that are sequentially connected, wherein an output end of the third electronic amplifier is connected to a drive end of the third intensity modulator.

11. The photonics-aided vector terahertz signal communication system according to claim 9, wherein the phase modulator drive module comprises a second signal radio frequency source, a second frequency multiplier, and a fourth electronic amplifier that are sequentially connected, wherein an output end of the fourth electronic amplifier is connected to a drive end of the phase modulator.

12. The photonics-aided vector terahertz signal communication system according to claim 9, wherein the optical frequency comb generation module further comprises a polarization maintaining fiber amplifier, wherein an input end of the polarization maintaining fiber amplifier is connected to an output end of the phase modulator, and an output end of the polarization maintaining fiber amplifier is connected to an input end of the vector terahertz signal generation module.

13. The photonics-aided vector terahertz signal communication system according to claim 1, wherein the optical fiber transmission module comprises an optical fiber and an optical fiber amplifier, wherein one end of the optical fiber is connected to an output end of the vector terahertz signal generation module, the other end of the optical fiber is connected to one end of the optical fiber amplifier, and the other end of the optical fiber amplifier is connected to the vector terahertz signal detection module.

14. The photonics-aided vector terahertz signal communication system according to claim 1, wherein the vector terahertz signal emission module comprises an antenna.

15. The photonics-aided vector terahertz signal communication system according to claim 1, wherein the optical fiber transmission module comprises an optical fiber and an optical fiber amplifier, wherein one end of the optical fiber is connected to an output end of the vector terahertz signal generation module, the other end of the optical fiber is connected to one end of the optical fiber amplifier, and the other end of the optical fiber amplifier is connected to the vector terahertz signal detection module.

16. The photonics-aided vector terahertz signal communication system according to claim 1, wherein the vector terahertz signal emission module comprises an antenna.

* * * * *